Nov. 4, 1941.  E. ZAMARRA  2,261,537
QUICK-ADJUSTING DEVICE
Filed Dec. 6, 1940
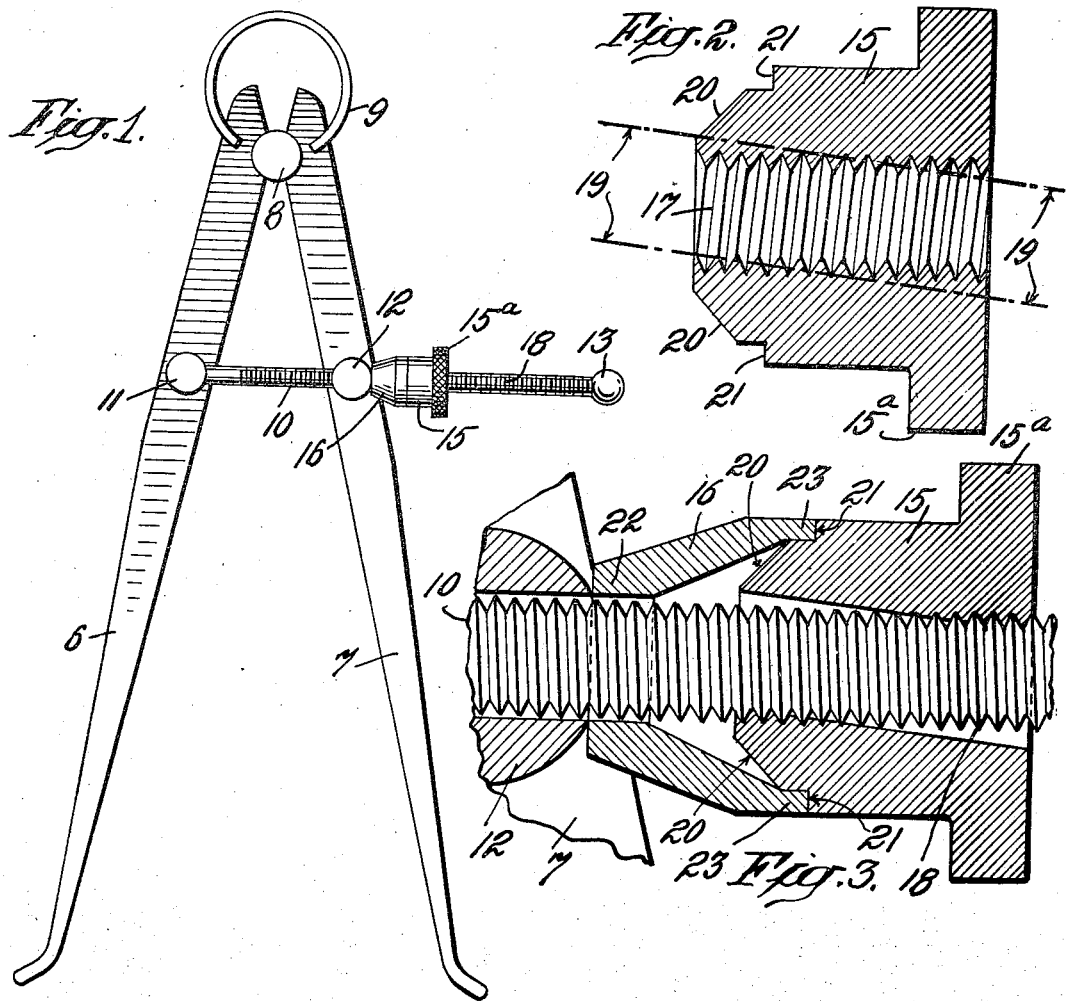
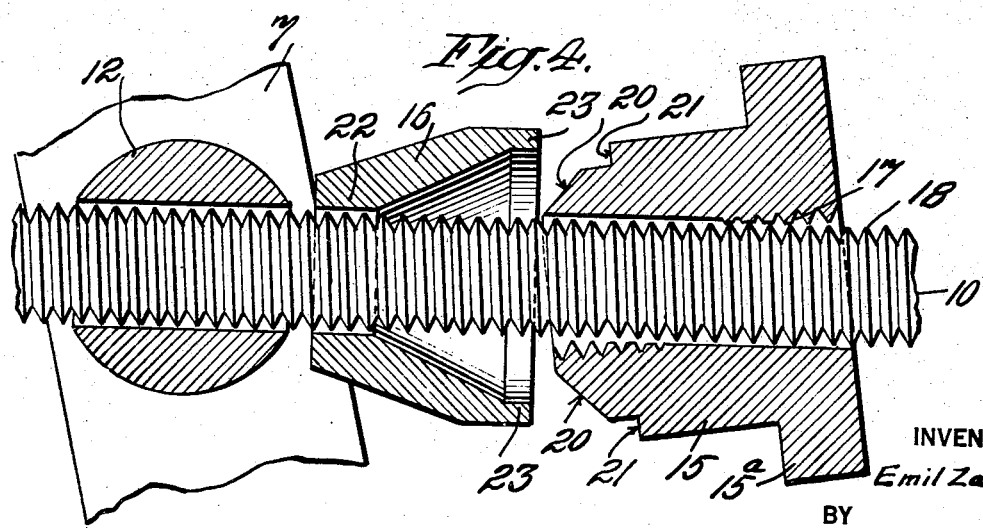
INVENTOR
Emil Zamarra
BY
Byerly, Watson & Simonds
ATTORNEYS Patented Nov. 4, 1941

2,261,537

UNITED STATES PATENT OFFICE 2,261,537

QUICK-ADJUSTING DEVICE

Emil Zamarra, Newark, N. J.

Application December 6, 1940, Serial No. 368,787

2 Claims. (Cl. 33—154)

This invention relates to an improved quick-adjusting device including a nut which is adapted to slide along a shank for making wide adjustments and which is adapted to threadedly engage the shank for making fine adjustments.

When a wide adjustment is to be made in the location of a threaded nut, for instance in setting a measuring instrument, it is tedious to turn the nut a great many times, especially if this has to be done often.

The object of the present invention is to provide a device of this character which is capable of being readily adjusted and which is also simple and inexpensive to manufacture.

The present invention provides a quick-adjusting device including a nut and a collar, the nut and collar having inter-engaging portions for holding the nut in threaded engagement with the shank when these portions are engaged, and the nut being adapted to slide along the shank when its axis is tilted at an angle to the axis of the shank. According to the preferred form of the invention, the nut and collar are each made of a single piece of metal.

An illustrative embodiment of the invention is shown in the accompanying drawing wherein:

Fig. 1 is a front view of calipers including a quick-adjusting device in accordance with the invention;

Figs. 2, 3 and 4 are sections of the device, enlarged six times;

Fig. 2 is a section through the nut at one stage of its manufacture;

Fig. 3 is a section through the device showing the nut and collar engaged for making fine adjustments; and Fig. 4 is a section similar to Fig. 3 but showing the nut and collar disengaged for making wide adjustments.

Calipers of standard construction are shown in Fig. 1 to illustrate one application of my quick-adjusting device. These calipers include arms 6 and 7 pivoted at 8 and engaged by a spring 9 which tends to spread the arms. A shank 10 having threads 18 is attached to the arm 6 by means of a pivoted lug 11 and extends through a pivoted lug 12 on the arm 7. The shank is provided with a head 13 to prevent the adjusting nut from falling off.

The nut 15 in the device illustrated is made from a single piece of metal. It may be provided with a knurled flange 15a. As best shown in Fig. 2, threads 17, which are adapted to fit threads 18 on the shank, are formed in the nut with their axis coinciding with the normal axis of the nut, the same as in manufacturing an ordinary nut. After the threads have thus been formed, the nut is reamed out at an angle to its normal axis, as indicated by the dot and dash lines 19. Thus part of the threads at the opposite sides and opposite ends of the nut are cut away; part remain. The end of the nut which is adapted to engage the collar is cut away as indicated at 20 and is provided with a sharp-cornered, annular shoulder 21 adapted to be snugly engaged by a flange on the collar.

The collar 16 in the device illustrated is also made from a single piece of metal and comprises a portion 22 which is adapted to slide along the shank 10 and an annular flange 23 which is adapted to snugly seat against the shoulder 21 of the nut. The collar is hollowed out so that the end of the nut may extend into the collar. By providing the cut-away portions 20 on the nut, the engagement of the collar and nut is facilitated.

When it is desired to make fine adjustments the annular flange 23 of the collar is engaged with the shoulder 21 on the nut. Since these male and female portions on the nut and on the collar seat snugly, the nut is held with its normal axis in line with the axis of the shank so that the threads on the nut engage the threads of the shank. Fine adjustments can then be made. When it is desired to make a wide adjustment, the collar is simply slid toward the left, away from the nut and against the action of the spring 9, and the nut is tilted, as shown in Fig. 4, so that it can be slid along the shank to any desired position. The nut is then tipped back into thread-engaging position, and the collar is engaged with the nut, as previously described, for making fine adjustments.

The present invention thus provides an extremely simple and inexpensive construction. The collar can be cast or formed by simple machine operations. The nut is made from a single piece of metal and requires only a single reaming in addition to the operations required for making an ordinary nut. The device is easily assembled, since the only additional operation required is slipping the collar on the shank. As previously indicated, the operation of the device is simple and rapid.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What I claim is:

1. A quick-adjusting device for use in combination with a threaded shank, comprising a nut having threads formed therein for threadedly engaging the shank, the axis of said threads coinciding with the normal axis of the nut, and portions of said threads being cut away at opposite sides and opposite ends of the nut to enable the nut to slide along the shank when held at an angle thereto, and a collar having a sliding fit on the shank, said nut and collar having inter-engageable square-cornered shoulder and flange portions constructed so that when engaged the nut is held in threaded engagement with the shank.

2. A quick-adjusting device for use in combination with a threaded shank, comprising a nut having threads formed therein for threadedly engaging the shank, the axis of said threads coinciding with the normal axis of the nut, and portions of said threads being cut away at opposite sides and opposite ends of the nut to enable the nut to slide along the shank when held at an angle thereto, and a collar having a sliding fit on the shank, said nut and collar having inter-engageable male and female portions constructed so that when engaged the nut is held in threaded engagement with the shank, said portions comprising an inter-engaging square-cornered shoulder and square-cornered flange, and said nut having tapered portions on its end and adjacent the collar to facilitate engagement of said portions.

EMIL ZAMARRA.